United States Patent [19]

Coenen et al.

[11] Patent Number: 5,190,672
[45] Date of Patent: Mar. 2, 1993

[54] METHOD FOR THERMAL DISPOSAL OF SEWAGE SLUDGE

[75] Inventors: Hubert Coenen, Aarbergen; Helmut Hubert, Wiesbaden; Friedhelm Bultmann, Aarbergen; Matthias Brunner, Hohenstein-Unterdorf, all of Fed. Rep. of Germany

[73] Assignee: Passavant-Werke AG, Fed. Rep. of Germany

[21] Appl. No.: 703,096

[22] Filed: May 22, 1991

[30] Foreign Application Priority Data

May 22, 1990 [DE] Fed. Rep. of Germany ....... 4016468

[51] Int. Cl.⁵ .................... F23G 5/00; B01D 53/00; F23J 15/00
[52] U.S. Cl. ............................... 210/770; 55/68; 55/71; 55/74; 55/84; 55/85; 55/208; 110/215; 110/216; 110/344; 110/345; 110/346; 210/769; 210/774; 423/109
[58] Field of Search ............. 210/769, 770, 774, 791; 110/215, 216, 344, 342, 346, 345, 243, 211; 55/68, 72, 73, 71, 74, 84, 85, 228, 242, 208, 522; 423/210, 210.5, 99, 109

[56] References Cited

U.S. PATENT DOCUMENTS

| | | | |
|---|---|---|---|
| 3,370,402 | 2/1968 | Nakai et al. | 55/94 |
| 4,116,830 | 9/1978 | Krogsrud | 55/89 |
| 4,153,655 | 5/1979 | Minnick et al. | 264/8 |
| 4,165,289 | 8/1979 | Borst | 210/769 |
| 4,321,151 | 3/1982 | McMullen | 210/769 |
| 4,617,180 | 10/1986 | Vogg | 423/109 |
| 4,620,492 | 11/1986 | Vogg et al. | 55/72 |
| 4,644,877 | 2/1987 | Barton et al. | 110/346 |
| 4,831,943 | 5/1989 | Aune | 110/346 |
| 4,860,671 | 8/1989 | Glorioso | 110/215 |
| 4,878,440 | 11/1989 | Tratz et al. | 110/346 |
| 4,905,614 | 3/1990 | Grigel et al. | 55/72 |
| 4,977,837 | 12/1990 | Roos et al. | 110/216 |
| 5,041,398 | 8/1991 | Kauser et al. | 423/109 |
| 5,080,026 | 1/1992 | Tsunemi et al. | 110/346 |

FOREIGN PATENT DOCUMENTS

| | | |
|---|---|---|
| 390131 | 3/1990 | European Pat. Off. |
| 1551863 | 2/1967 | Fed. Rep. of Germany . |
| 3840858 | 9/1989 | Fed. Rep. of Germany . |
| 2348724 | 11/1977 | France . |
| 9012249 | 10/1990 | World Int. Prop. O. . |

Primary Examiner—Robert A. Dawson
Assistant Examiner—Sun Uk Kim
Attorney, Agent, or Firm—Larson and Taylor

[57] ABSTRACT

A method of thermal disposal of sewage sludge. The sludge is dried and incinerated. The flue gases from the incineration are washed. The flue gas dust resulting from the incineration and the sludge resulting from washing of the flue gases are treated together with high temperature combustion which includes melting of solids.

12 Claims, 1 Drawing Sheet

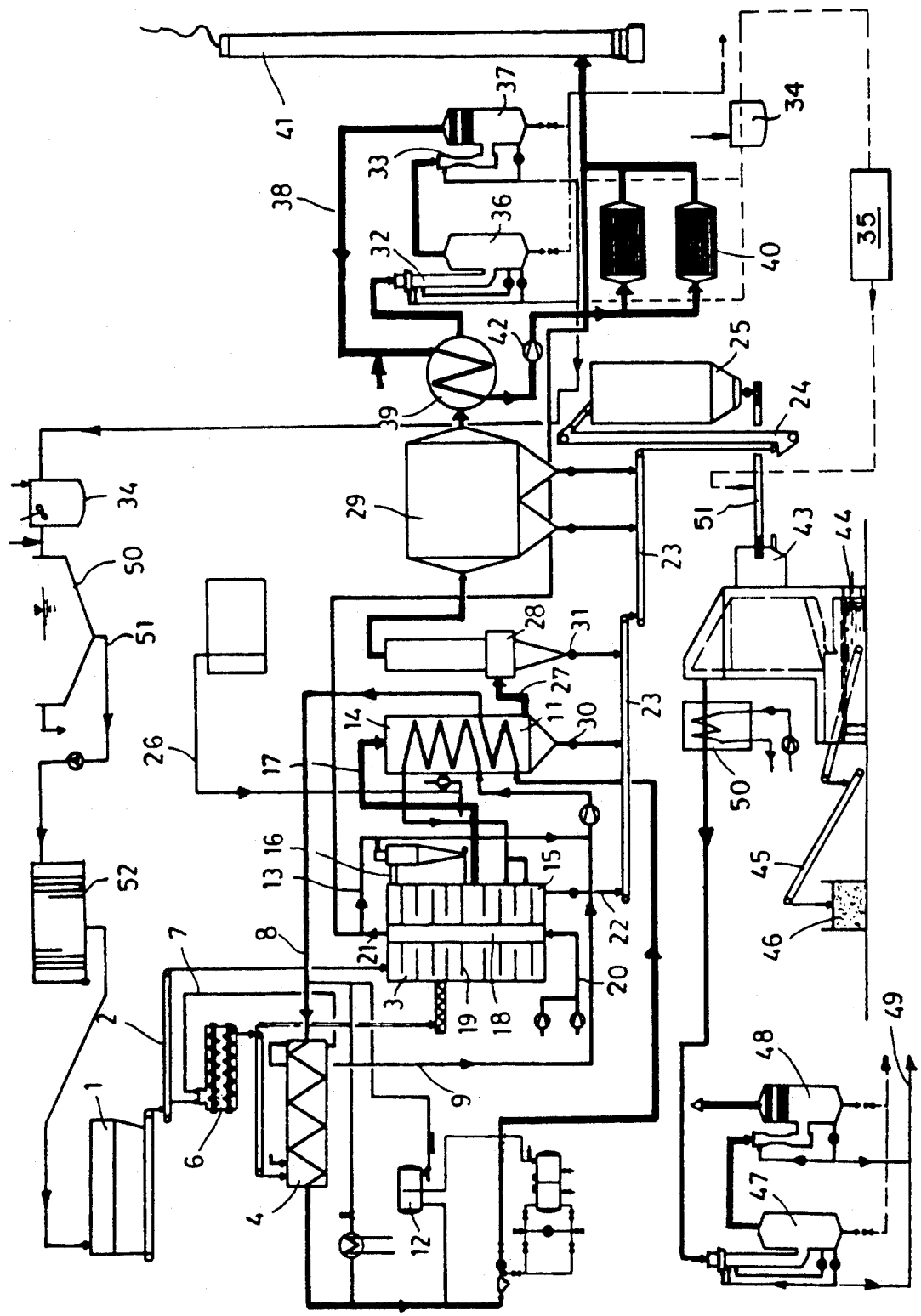

METHOD FOR THERMAL DISPOSAL OF SEWAGE SLUDGE

BACKGROUND OF THE INVENTION

The invention relates to a method of thermal disposal of all types of sewage sludge and to an installation for carrying out this process.

Presently, in the Federal Republic of Germany approximately 50 Million tons of sewage sludge are produced yearly during waste water purification. This value refers to sewage sludge containing 5% dry solids and 95% water. The quantity of dry solids consequently adds up to about 2.5 million tons/year. Fifty percent of these dry solids come from domestic and industrial sewage sludge, respectively.

Until about 10 years ago, sewage sludge was disposed of without problems by distributing it onto farm land and forest areas. Because of its high contents of potash, nitrogen and phosphor it used to be a valuable and also economic fertilizer. The content of heavy metals, which frequently was considerably high, as well as the fear that sewage sludge depending on its origin could be contaminated with polychlorinated biphenyl and dioxines has brought sewage sludge as fertilizer into discredit and prevented its distribution.

With these rising problems and at the culmination of the oil crisis at the end of the 1970's, one began to search for new ways to use sewage sludge energetically by incineration. Simultaneously, controlled dumping was used.

Against the background of these attempts, disposal of sewage sludge actually is carried out as follows:

59% is dumped.
29% is used in agriculture and forestry,
9% is composted.

Lately it becomes more and more difficult and expensive to dump sewage sludge in the neighbourhood of densely populated areas. Appropriate dump areas are scarce. Therefore, the percentage of incineration is increasing rapidly. But also against incineration opposition begins to form because of the aforementioned contamination of flue gases with dioxines and other chemical compounds suspected to be carcinogenic.

The disadvantage of the incineration methods developed thus far consists in that the ashes, and above all the dust from filtration, are considered as special waste because of its possible contamination with dubious substances such as heavy metals, and because of a carryover of halogenated cyclic hydrocarbon deriving from an incomplete incineration, which entails problems of a special waste dumping or disposal.

All methods thus far developed for thermal disposal of sewage sludge include the following process steps:
thickening;
dewatering (dehydration);
drying;
incineration;
treatment of gases
disposal of residuals.

For each process step different reliable components are available.

For example, dewatering is carried out with filter presses, belt filter presses or centrifuges after preceding flocculation and thickening.

Drying uses cylindrical rotary kilns, kilns with overlying beds, fluidized bed furnaces, grinding driers or indirect driers of different constructions. The incineration is carried out either in combination with drying directly in kilns with overlying beds or separately in following fluidized bed furnaces, dust ovens or in slag tap furnaces. The flue gases are post-combusted in electric filters and washers, if necessary.

SUMMARY OF THE INVENTION

The invention described below in presents a method which prevents a carry-over of problematical gas contents and which transforms the residual substances, especially ashes and filtration dust into a condition allowing its reuse as material e.g. as aggregates for construction, without any problem. Also from the energy point of view attempts are made especially to reach an optimum of heat recovery.

This task is completed according to the invention in that the ashes and filtration dust occurring during incineration and the contaminated sludge accumulating in the flue gas washer are treated together by high temperature combustion where the solids are melted down. It has been noticed that heavy metals, dioxines and furanes not only form an additional compound with the ashes but also with flue dust. This capacity allows binding of the heavy metals (with the exception of mercury) during the melt-down of all the ashes within the melted mass. The melting temperatures of more than 1200° C. make it possible at the same time to thermally decompose dioxines and furanes into harmless compounds, where high priority is given to a sufficient retention time and consequently to a high security disposal. The melted ashes are cooled, preferably in a following water bath where they form granules which are then put into a temporary storage before they are discharged. In order to reach such high melting temperatures either an arc furnace or a plasma furnace can be used. The exhaust vapours occurring during cooling are recooled within a condenser. The heat recovered along with recooling can be used to heat the digestion tank.

The flue gases expanding from the melted ashes still contain a considerable amount of mercury. They are treated, therefore, at least in a one stage flue gas washer; in case of a two-stage operation, the wash water is acidified in the first stage and alkalified in the second stage. The wash water can be treated separately after passing through a sedimentation step where primary mercury settles down and can be withdrawn.

After the flue gases of the low temperature combustion have passed the flue gas washer they are fed, according to the invention, to an activated charcoal filter where the residual fine dust and halogens are retained. The vapours resulting from thermal regeneration of the activated charcoal are subsequently fed, according to the invention, to the high temperature combustion so that also these contents are decomposed into harmless compounds.

BRIEF DESCRIPTION OF THE FIGURE

The FIGURE is an appropriate installation for performing the process of thermal disposal of sewage sludge.

DETAILED DESCRIPTION OF THE INVENTION

The sewage sludge which has been dewatered, e.g. in a chamber filter press, up to a dry solids content of about 25% will be introduced first into a box-type feeder (1) serving as temporary storage.

This feeder, a drag chain conveyer with box-type top, offers a controlled discharge of the filter cake and thereby determines at the same time the thruput capacity of the installation. The box-type feeder is placed above a furnace which is shown here as an overlying bed kiln: (3).

The conveying system (2) following the box-type feeder offers the possibility to by-pass the drier (4) and to feed the filter cake directly to the kiln (3).

According to the correct operation procedure, there now follows the twin-shaft mixer (6). Here the dry solids content (DS-content) which is required for the combustion will be adjusted by adding material (7) which has been dried up to a content of about 95% dry solids. With the addition of dried material (7) the glueing phase can be skipped and thereby the drying process be secured.

In the disc drier (4) which is heated indirectly with thermal oil (8) only that amount of filter cake material is dried which corresponds to the desired furnace capacity.

The thermal oil is heated within the second flue gas recuperator (11) following the furnace (3). Eventual excess heat within the thermal oil circuit (8) is carried off within the recooling unit (12). In the version presented in the flow diagram, the exhaust vapours (9) of the drier (4) are introduced jointly with the flue gas/exhaust vapours mixture (16) and the combustion air (13) via the first recuperator (14) into the lowest bed (15) of the overlying bed kiln (3). The mixture is pre-heated in the first recuperator (14) by the flue gas (17) of the overlying bed kiln (3).

The overlying bed (3) kiln is equipped with an integrated post-combustion stage (lowest bed 15) for the incineration of the filter cakes. The upper beds of the kiln serve for an additional drying of the filter cakes and the lower beds for the combustion and the cooling of ashes.

Alternatively to the overlying bed (3) kiln a fluidized bed furnace can be used. The exhaust vapours (9) of the drier (4) heated in the first recuperator (14) are introduced into the lowest bed (15) where they cool the ashes. With releasing of the heat included in the filter cakes, the temperature of the flue gas (17) jumps up to about 900° C.

The cooling air (20) necessary for cooling of the tube shaft (18) and the stirring arms (19) serves as combustion air. The cooling air (21) which has a temperature of about 160° C., when leaving the tube shaft, is introduced jointly with the aforementioned exhaust vapours/flue gas mixture into the lowest bed of the kiln with overlying beds via the first recuperator (14).

When a support firing, i.e. additional heat, is required for the incineration, this heat will be introduced into the combustion zone by means of forced-air gas burners; these are activated and switched off or regulated in capacity automatically in dependance of the pre-set temperature.

In order to meet the requirements of the incineration process as well as possible the system provides an adjustable motorized rabble unit.

The ashes produced in the overlying kiln (3) are discharged via a chute (22) and a screw conveyer (23) and transported by a bucket elevator (24) into the ash silo (25).

The flue gas (17) leaves the combustion zone of the overlying bed kiln (3) at a temperature of approximately 900° C. and serves to heat the air mixture and the thermal oil in the following recuperators (11, 14). The flue gas thereby is cooled down to approx. 260° C.

Prior to this, a reduction of nitrogen oxides is initiated by introducing of ammonia (26) into the combustion zone by means of fuses.

The flue dust (27) escaping with the flue gas (17) from the overlying bed kiln (3) is separated in the recuperators (11, 14) in a smaller degree and mainly in the following cyclone (28) and the electric filter (29). From here the ashes are conveyed via cellular wheel sluices (30, 31) and collecting screws (23) to the bucket elevator (24) and ash silo (25).

Besides dedusting of flue gases in the recuperators (11, 14), cyclone (28) and electric filter (29) the flue gases are treated further in a two-stage flue gas washer (32, 33). The main task of the flue gas washer, besides cooling down the gases from approx. 260° C. to approx. 60°–80° C., consists in the removal of harmful substances. In the washers which are operated with acidified water (32) or alkalified water (33), heavy metals and harmful gases, e.g. HCl, $SO_2$ and mercury, are separated.

The flue gas washers have an internal water circuit and are operated with secondary effluent. The water now including a high concentration of ashes, hydroxides and salts, is introduced into a neutralisation tank (34) and from there continually to a wastewater treatment (35) from which the resulting residue is delivered to furnace (43) to be heated together with the high temperature combustion which melts solids. The mercury settles on the bottom of the washers (36, 37) and is extracted from there in batch quantities into special collecting tanks.

The saturated flue gases (38) leaving the the washers and being cooled down below dew point temperature are heated to somewhat more than 120° C. in a heat exchanger (39) being placed between the electric filter and the washers.

An unduced-draught blower (42) following the heat exchanger helps to overcome the resistances in the installation and pushes the flue gases through an activated charcoal filter (40) in the chimney (41).

With the use of an activated charcoal filter (40), the requirements to limit the dioxine and furane compounds as far as possible are complied with. The charged activated charcoal can be disposed of in the overlying bed kiln (3). If the activated charcoal shall be regenerated thermally, the vapors originated here are introduced into the high-temperature combustion described above.

The ashes and flue dust collected in the silo (25) are fed to a melting furnace (43) by means of a proportioning screw (51). The melting furnace (43) can be an arc furnace or a furnace with a plasma torch. During melting of the whole ashes all heavy metals (with the exception of mercury) are bound into the melted mass. Due to the high melting temperature of more than 1200° C. it is possible thermally break dioxines and furanes at the same time.

The melted ashes are cooled in a following water bath (44) where they form granules (45) which then are stored in a temporary storage (46) before they are discharged.

The heat resulting from cooling-down of the granules causes the formation of exhaust vapours. It is possible to recover this heat by means of a condensate cooling unit (50) and then use it to heat the digestion tower.

The exhaust vapours from the melting furnace (43) are treated again in a two-stage washer (47, 48). The resulting wastewater (49) can be treated in the same treatment plant where the water from the flue gas washers (32, 33) is treated. Here mercury is settling too and can be discharged from below.

We claim:

1. A method of thermal disposal of sewage sludge, comprising the steps of; drying the sludge, incinerating the sludge, dedusting the flue gas resulting from incineration, and washing the flue gas, wherein the ashes and flue gas dust resulting from incineration and the sludge resulting from flue gas washing are treated together with high temperature combustion which includes melting of solids.

2. A method according to claim 1, wherein the melting occurs at a temperature of more than 1200° C.

3. A method according to claim 1, including the step of cooling the melted down solids in a water bath where the solids are formed into granules.

4. A method according to claim 3, wherein the cooling step causes exhaust vapors, and including the step of recovering said exhaust vapors in a condensate cooling unit.

5. A method according to claim 1, wherein the high temperature combustion step generates flue gases and including the step of washing said flue gases in at least a one-stage flue gas washer.

6. A method according to claim 5, including introducing the wash water from said at least one stage flue gas washer into a special waste water treatment step.

7. A method according to claim 5, including discharging heavy metals from wash water following a flue gas washing step.

8. A method according to claim 1, including condensing heavy metals during the flue gas washing step and discharging out the settled heavy metals following the washing step.

9. A method according to claim 8, wherein the incineration flue gas washing step includes two stages, namely a first acidified stage wherein heavy metals and adhered harmful substances are washed out and a second alkalfied acid gas stage.

10. A method according to claim 8, wherein, following the step of washing the incineration flue gas, the flue gas is fed to an active charcoal filter.

11. A method according to claim 10, including thermally regenerating the activated charcoal and introducing the vapors occurring during regeneration into the high temperature combustion.

12. A method according to claim 1, including mixing together dewatered sludge and already dried sludge at the beginning of the drying step.

* * * * *